US012663263B2

(12) United States Patent
Meile et al.

(10) Patent No.: US 12,663,263 B2
(45) Date of Patent: Jun. 23, 2026

(54) BATCH PRODUCTION SYSTEM AND BATCH PRODUCTION METHOD

(71) Applicant: HEXAGON INNOVATION HUB GMBH, Heerbrugg (CH)

(72) Inventors: Silvan Meile, St. Gallen (CH); Maximillian Macha, Weingarten (DE)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 501 days.

(21) Appl. No.: 17/962,671

(22) Filed: Oct. 10, 2022

(65) Prior Publication Data

US 2023/0114210 A1     Apr. 13, 2023

(30) Foreign Application Priority Data

Oct. 11, 2021   (EP) .................................... 21201935

(51) Int. Cl.
*G01B 21/04* (2006.01)
*G01B 5/008* (2006.01)

(52) U.S. Cl.
CPC ........... *G01B 21/042* (2013.01); *G01B 5/008* (2013.01)

(58) Field of Classification Search
CPC ................... G01B 21/042; G01B 5/008; G05B 2219/37558; G05B 2219/39214; G05B 2219/41119; G05B 2219/49169; G05B 19/404
See application file for complete search history.

(56) References Cited

U.S. PATENT DOCUMENTS

| | | |
|---|---|---|
| 6,400,998 B1 | 6/2002 | Yamazaki |
| 2012/0213604 A1* | 8/2012 | Gu ....................... G05B 19/402 |
| | | 409/131 |

(Continued)

FOREIGN PATENT DOCUMENTS

| | | |
|---|---|---|
| CN | 106126767 A | 11/2016 |
| CN | 108073132 A | 5/2018 |

(Continued)

OTHER PUBLICATIONS

Gu, Jie, and John S. Agapiou. "Incorporating local offset in the global offset method and optimization process for error compensation in machine tools." Procedia Manufacturing 34 (2019): 1051-1059 (Year: 2019).*
Sortino, M., Belfio, S., Motyl, B., & Totis, G. (2014). Compensation of geometrical errors of CAM/CNC machined parts by means of 3D workpiece model adaptation. Computer-Aided Design, 48, 28-38 (Year: 2014).*

(Continued)

*Primary Examiner* — Christopher E. Everett
(74) *Attorney, Agent, or Firm* — Maschoff Brennan

(57) ABSTRACT

A batch production system comprising a machine tool for consecutively machining a batch of workpieces into machined pieces, the machine tool comprising a workpiece support configured for supporting the workpieces, a cutting tool, a movement system configured for providing a relative movement between the cutting tool and the workpiece support with at least two degrees of freedom, a control unit configured for controlling the movement system based on numerical control data and compensation data for compensating volumetric positioning errors of the movement system. The numerical control data are based on nominal geometry data representing a target piece that is desired to be achieved when machining the batch of workpieces into the machined pieces.

19 Claims, 2 Drawing Sheets

(56) References Cited

U.S. PATENT DOCUMENTS

| | | | |
|---|---|---|---|
| 2012/0215341 A1* | 8/2012 | Gu | G05B 19/4083 |
| | | | 700/173 |
| 2012/0215342 A1* | 8/2012 | Gu | G05B 19/401 |
| | | | 700/192 |
| 2016/0327931 A1 | 11/2016 | Gu | |
| 2018/0136626 A1 | 5/2018 | Gu | |
| 2019/0377317 A1 | 12/2019 | Wilcox et al. | |
| 2021/0181706 A1 | 6/2021 | Antongiorgi et al. | |

FOREIGN PATENT DOCUMENTS

| | | | |
|---|---|---|---|
| EP | 3470777 | A1 | 4/2019 |
| WO | 9819821 | A1 | 5/1998 |

OTHER PUBLICATIONS

Jie Gu, et al., "CNC machine tool work offset error compensation method," Journal of Manufacturing Systems, Society of Manufacturing Engineers, vol. 37, pp. 576-585 (Dec. 5, 2015).

Extended European Search Report dated Apr. 20, 2022 as received in Application No. 21201935.0.

Hongzan Bin, "Digital Control of Machining Process," Huazhong University of Science and Technology Press, pp. 374-375 (Apr. 1999).

Bodi Cui, "Research Status of Physical Simulation Technology for Turning Machining," Harbin Institute of Technology Press, pp. 12-14 (Dec. 2014).

CN Office Action dated Mar. 20, 2025 as received in Application No. 202211187294.4.

* cited by examiner

BATCH PRODUCTION SYSTEM AND BATCH PRODUCTION METHOD

FIELD

The present disclosure relates to a batch production system and a batch production method for consecutively machining a batch of workpieces into machined pieces.

BACKGROUND

Despite being designed for repeatability, machine tools are not perfect instruments due to both internal (e.g. wear) and external (e.g. environmental thermal loads) factors. In serial production repeatability of work piece, quality is key and the non-repeatability of a machine tool may be a critical element.

Obviously, the measured quality (e.g. on a CMM) of a machined piece gives indication on the quality of the following machines pieces. Therefore, the general idea of installing a kind of control loop, where the measured piece quality is used to change the way the following workpieces are machined.

For example, to machine the sidewalls of a milled borehole, the machine tool moves on a circle of diameter d_Command=d_Borehole−(d_Tool+d_ToolComp), where d_Tool is the diameter of the milling tool, d_ToolComp is a compensation value (milling tools are never perfect), d_Command is the diameter of the circular movement of the machine defined in the NC program and d_Borehole is the diameter of the final borehole. Now, in case the diameter is measured to be too small one has two options:

The first option is to command the machine to move on a slightly bigger diameter, thus change the value d_Command directly in the NC program that runs on the machine tool.

The second option is to reduce the value d_ToolComp, which frankly also changes the value of d_Command.

There is a very important difference between these two approaches that is of major importance explaining the disclosure. For the first option, the machining NC program needs to be changed. Despite being standardized there are many possibilities to program the machine. Even for such a simple operation described above, i.e. move on a circle, there are multiple approaches. A control loop now would have to automatically understand the approach used and change the code accordingly. As for the second option, things are much easier. The value d_ToolComp exists for all machine tools and we only have to care about one value. So, despite the first and second options lead to the same action (machine moves on a bigger diameter), the second option is a lot simpler.

As manipulations of the NC program or the tool compensation value are very specific to each machine tool manufacturer, there is need for a generalization of this approach.

OBJECT

Therefore, the disclosure provides an improved batch production system and a batch production method. A batch production system and a batch production method according to the disclosure allow for a more persistent, robust, reliant, accurate, and thus more efficient batch production.

SUMMARY

Proposed is a way to intervene in the compensation data of a machine tool, which is sometimes referred to as volumetric compensation map, in order to improve the machining result. For example, based on position measurements of a machined piece, a modification of the volumetric compensation is determined to achieve a better result for the next piece being produced. Besides the measurements (e.g. on a CMM), at least the machining path (given by the NC-program) is to be considered. With this workflow one is capable to compensate for both intrinsic and extrinsic errors of the manufacturing process.

It is noted that this is by far not the use of the volumetric compensations they were made for. It is to a certain extend a "misuse" of the volumetric compensation map. In normal operations, the volumetric compensation compensates for the intrinsic errors of a machine tool, thus ignoring the extrinsic influences such as e.g. the forces caused by the milling process. Still referring to the "regular" use of the volumetric compensation, getting the configuration of such a compensation algorithm right is a cumbersome process that features expensive hardware. For example, amongst many other companies, the Hexagon company Etalon builds hardware and software to perform this operation and to find an optimal compensation configuration mostly limited to the intrinsic effects. Following this process leads to a generally valid compensation configuration, meaning, that the compensation will correct unintentional behavior for a large portion of machining operations on one specific machine tool.

The proposed configuration, however, is only valid for a specific machine tool in a specific configuration (tools etc.), operating with a specific environmental temperature, in a specific state of wear, with a specific NC program, and with a specific material of the workpiece. It is assumed that the machine will have a repeatable behavior for a certain amount of time (valid compensation configuration) and that a new compensation configuration (compensation data) will be available before the machine tool changes significantly (error accumulation).

The disclosure relates to a batch production system comprising a machine tool for consecutively machining a batch of workpieces into machined pieces, the machine tool comprising a workpiece support configured for supporting the workpieces, a cutting tool, a movement system configured for providing a relative movement between the cutting tool and the workpiece support with at least two degrees of freedom, a control unit configured for controlling the movement system based on numerical control data and compensation data for compensating volumetric positioning errors of the movement system, wherein the numerical control data are based on nominal geometry data representing a target piece that is desired to be achieved when machining the batch of workpieces into the machined pieces, the batch production system further comprising a computer configured for receiving measurement data, the measurement data based on at least one geometrical property of at least one of the batch of machined pieces, modifying the compensation data based on the received measurement data and the nominal geometry data.

In some embodiments, the measurement data comprise three-dimensional point coordinates for at least one point.

In some embodiments, the measurement data comprise a three-dimensional point cloud.

In some embodiments, the compensation data comprise at least one compensation value associated with a three-dimensional position coordinate of the movement system.

In some embodiments, the at least one compensation value comprises at least one position offset value associated with an axis of the movement system.

In some embodiments, at least one compensation value comprises at least one angle offset value associated with an axis of the movement system.

In some embodiments, modifying the compensation data is further based on at least one of a position and an orientation of the workpiece support.

The disclosure further relates to a batch production method of consecutively machining a batch of workpieces into machined pieces with a machine tool, the method comprising placing a first workpiece of the batch of workpieces at a workpiece support of the machine tool, providing numerical control data based on nominal geometry data representing a target piece that is desired to be achieved when machining the batch of workpieces into the machined pieces, machining the first workpiece into a first machined piece with a cutting tool of the machine tool and by controlling a movement system of the machine tool based on the numerical control data and compensation data for compensating volumetric positioning errors of the movement system, determining measurement data, the measurement data based on at least one geometrical property of the first machined piece, providing the measurement data to a computer, modifying the compensation data with the computer based on the measurement data and the nominal geometry data, placing a second workpiece of the batch of workpieces at the workpiece support of the machine tool, machining the second workpiece into a second machined piece with the cutting tool of the machine tool and by controlling the movement system of the machine tool based on the numerical control data and the modified compensation data.

In some embodiments, the measurement data comprise three-dimensional point coordinates for at least one point.

In some embodiments, the measurement data comprise a three-dimensional point cloud.

In some embodiments, the compensation data comprise at least one compensation value associated with a three-dimensional position coordinate of the movement system.

In some embodiments, the at least one compensation value comprises at least one position offset value associated with an axis of the movement system.

In some embodiments, at least one compensation value comprises at least one angle offset value associated with an axis of the movement system In some embodiments, the method further comprises determining at least one of a position and an orientation of the workpiece support, wherein modifying the compensation data is further based on at least one of the position and orientation.

BRIEF DESCRIPTION OF THE DRAWINGS

By way of example only, preferred embodiments will be described more fully hereinafter with reference to the accompanying figures, wherein.

DETAILED DESCRIPTION

Figures 1, 2, 3:
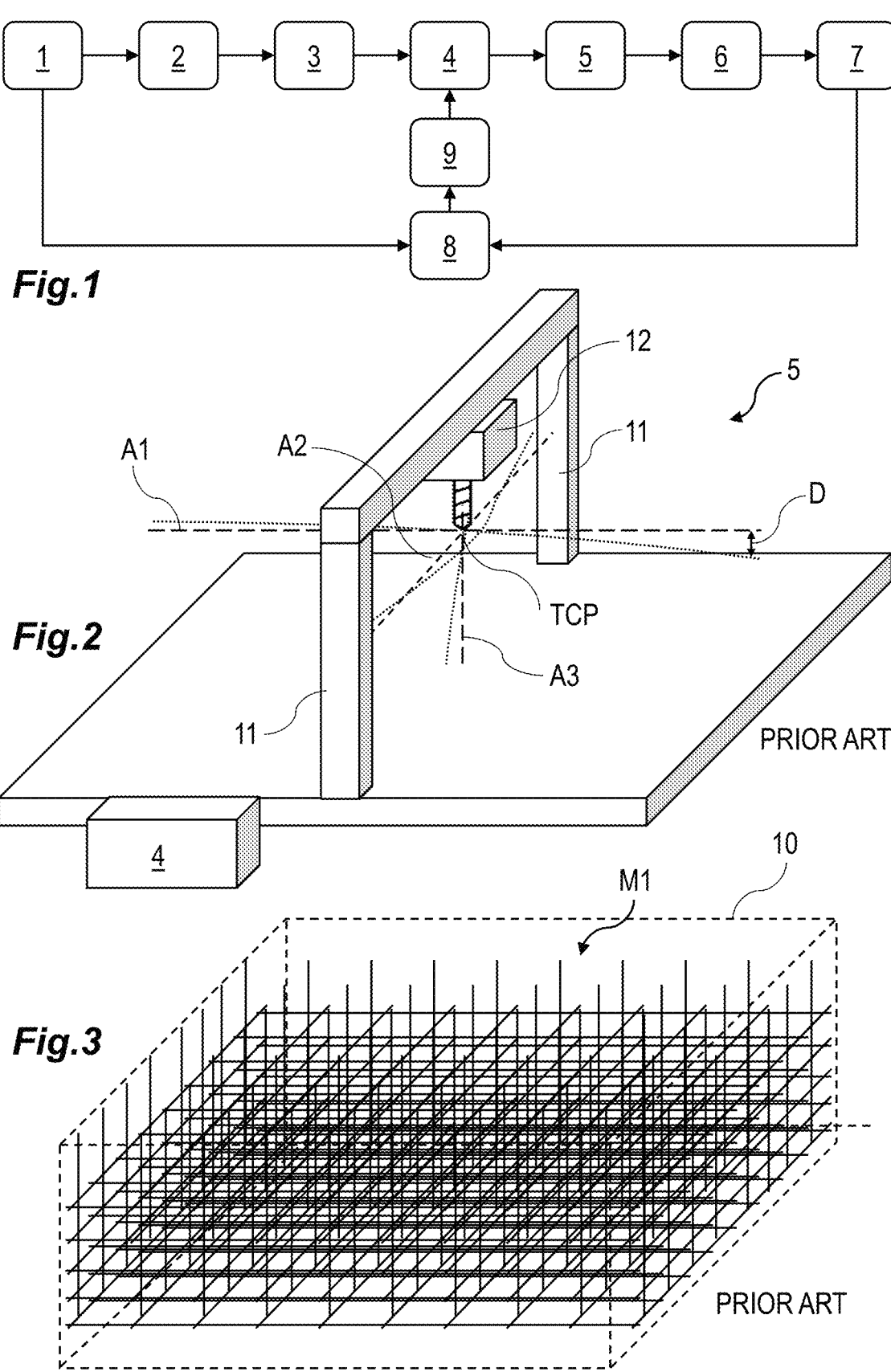
FIG. 1 shows a flow chart of one embodiment.
FIGS. 2 and 3 show a machine tool and a symbolic view of a compensation map according to the prior art.

FIG. 1 shows a batch production work flow that makes use of an embodiment. The nominal geometry 1 of a target piece is provided to a computer-aided manufacturing (CAM)

software 2 which generates an numerical control (NC) data 3. This NC data 3 is then provided to a control unit 4 of a machine tool 5 which machines one workpiece after another into a machined piece based on the NC data 3 and compensation data 9. The compensation data are normally provided in the prior art for compensating volumetric positioning errors of a movement system of the machine tool. This will be explained in more detail with FIGS. 2 and 3. Still referring to FIG. 1, every n-th machined piece of the batch (with n being a whole number) is taken to a coordinate measuring machine (CMM) 6 to obtain a precise point cloud measurement of its surface. The measurement data 7 are then provided to a computer 8 where, based on the measurement data 7 and the nominal geometry 1, the compensation data 9 currently used by the machine tool are modified and provided to the control unit 4. In some particular embodiments, the NC data 3 can also be taken into account when modifying the compensation data. The modification of course is aiming at an improvement of the machined piece, wherein it is "learnt from the evidence".

FIG. 2 shows an exemplary machine tool and a symbolic illustration of volumetric positioning errors of its movement system. The shown machine tool is a portal milling machine with an end mill that can be positioned anywhere within the range of motion 10 (see FIG. 3) by means of its movement system, i.e. the portal stands 11 are slidable parallel to a first axis A1, the carriage 12 is slidable parallel to a second axis A2, and the tool holder (not visible) holding the end mill can move along a third axis A3. The axes A1-A3 meet at the current tool center point TCP. The dot-dashed lines indicate the deviation that the TCP would have from the ideal axis position when travelling to along the respective axis. That is, associated with any position that the TCP can occupy, the compensation data comprise at least one, in the shown example: three compensation values (because there are three axes) representing an offset from the ideal position. With help of the compensation data, these volumetric errors can be compensated resulting in a more precise piece production.

FIG. 3 shows symbolically this "matrix" M1 of compensation values within the range of motion 10 of the movement system. The compensation values might in fact only be available in an adequate resolution wherein in between these values or vectors, the control unit 4 of the machine tool 5 may interpolate at any three-dimensional position coordinate of the movement system.

This principle as explained with FIGS. 2 and 3 exist in the prior art for one reason: compensation of the machine movement system. After relatively long periods of time, the movement system of a machine tool and the cutting tool itself become more and more inaccurate as positioning errors accumulate e.g. due to thermal factors, wear, and process forces. Especially after machining different pieces with different geometries over the relatively long period of time, these volumetric errors become so relevant that a compensation step is necessary. The usual way to tackle these errors is to measure the TCP at a plurality of positions (and optionally also orientations) with a high-precision measuring devices, such as a self-tracking laser interferometer. A new volumetric compensation map (compensation data) can then be generated by comparing the actual position (and orientation) data with the target position data that the machine thinks are the position data of the TCP. By means of this compensation procedure, the compensation data cover the whole available range of motion of the movement system. That is why it is an extremely tedious, timeconsuming, and expensive process which can under no circumstances be integrated in the normal course of production.

The present disclosure, however, takes a different path and makes use of this principle in a way that was not at all intended by the prior art: compensation of a batch production process. So to speak, this is a "misuse" of aspects of the principle as described above. According to the disclosure, it is not a vast and complex testing dummy that is machined and measured for the compensation, but it is one of the actual products produced in a serial (batch) production. As the procedure is not so elaborate, it can be repeated more than once per production batch. A reasonable interval n (where every n-th piece is measured and used for an update) can be found where an update of the compensation data is found to have the most efficient impact.

Figure 4:
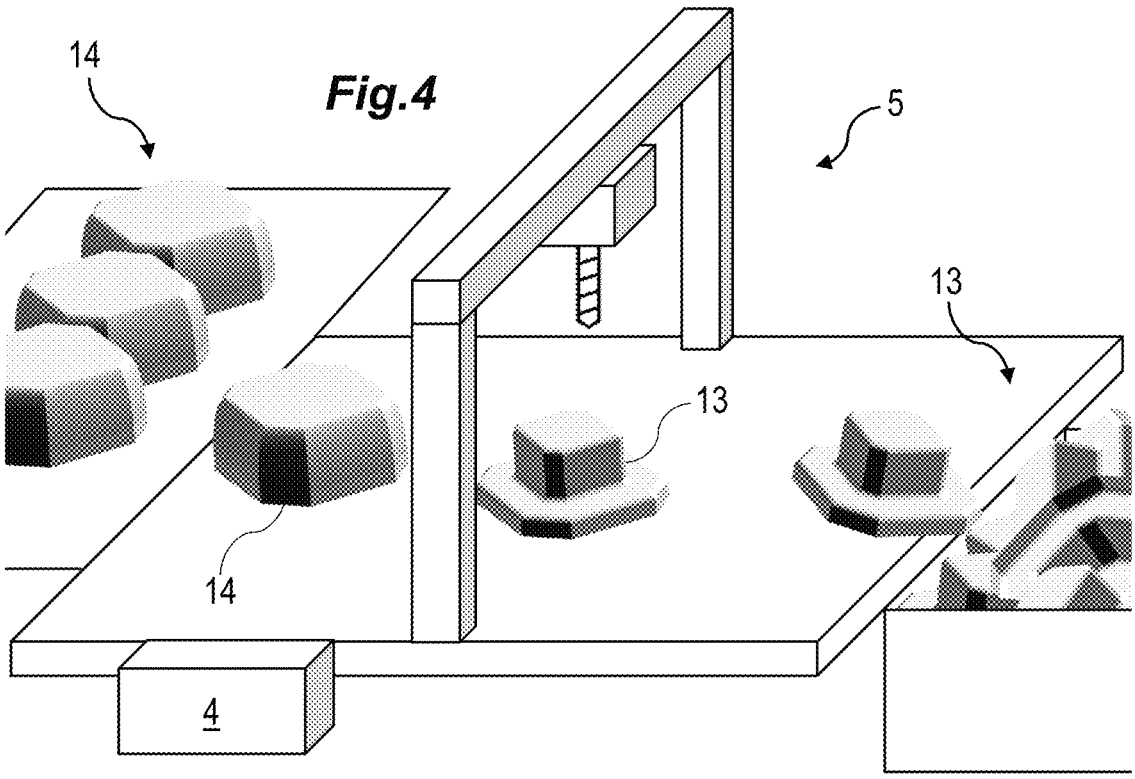
FIG. 4 shows an embodiment of a batch production system.
Figure 5:
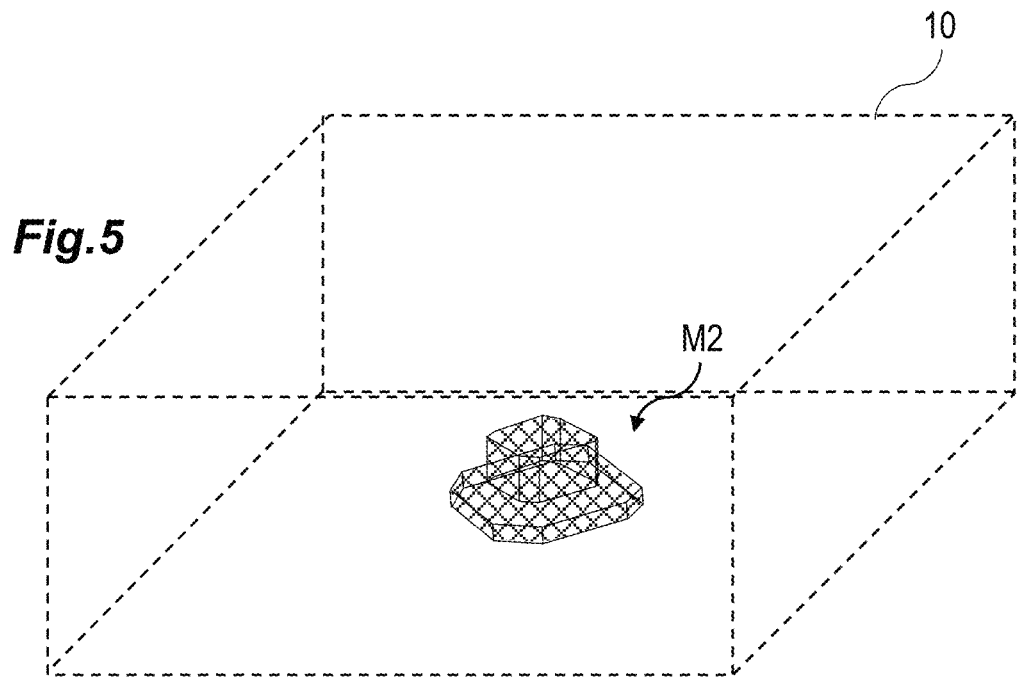
FIG. 5 shows an embodiment of modified compensation data.

As per FIGS. 4 and 5, which illustrate aspects of one exemplary use case, batch production pieces 13 are machined from workpieces 14 with the machine tool 5. That is, the machine tool 5 runs a batch production process of recurring machining steps defined by NC data 3 and based on the current version of the compensation data 9. In the shown example, every tenth of the machined pieces 13 is gauged by a CMM resulting in measurement data comprised of a point cloud that describes the surface of the machined piece. The denser the point cloud is, the more accurate the modification of the compensation data will be.

As can be seen in FIG. 5, compensation values M2 comprised by the compensation data 9 are restricted to a three-dimensional "window" inside the range of motion 10. These values M2 directly and only provide compensation for those machine coordinates that are stored in the NC data 3. This way, neither the nominal geometry 1, nor the CAM software 2, nor the NC data 3, nor something in the control unit 4 needs to be manipulated or intervened in.

Although aspect are illustrated above, partly with reference to some preferred embodiments, it must be understood that numerous modifications and combinations of different features of the embodiments can be made. For example, the machine tool is not necessarily a portal milling machine, but can also be a drill, lathe, or any other type of mill. Furthermore, the measuring device used for obtaining a point cloud of a machined piece is not necessarily a CMM, but can be, for example, a laser or white-light scanner, or other tactile or optical measuring devices. All of these modifications lie within the scope of the appended claims.

The invention claimed is:

1. A batch production system comprising a machine tool for consecutively machining a batch of workpieces into machined pieces, the machine tool comprising:
   a workpiece support configured for supporting the workpieces,
   a cutting tool,
   a movement system configured for providing a relative movement between the cutting tool and the workpiece support with at least two degrees of freedom,
   a control unit configured for controlling the movement system based on
   numerical control data and
      a volumetric compensation map for compensating volumetric positioning errors of the movement system, wherein the volumetric positioning errors comprise intrinsic errors of the machine tool,
wherein the numerical control data are based on nominal geometry data representing a target piece that is desired to be achieved when machining the batch of workpieces into the machined pieces, a computer configured for:
   receiving measurement data, the measurement data based on at least one geometrical property of at least one of the batch of machined pieces,
   modifying the volumetric compensation map based on the received measurement data and the nominal geometry data.

2. The batch production system according to claim 1, wherein the measurement data comprise three-dimensional point coordinates for at least one point.

3. The batch production system according to claim 1, wherein the measurement data comprise a three-dimensional point cloud.

4. The batch production system according to claim 1, wherein the volumetric compensation map comprise at least one compensation value associated with a three-dimensional position coordinate of the movement system.

5. The batch production system according to claim 4, wherein the at least one compensation value comprises at least one position offset value associated with an axis of the movement system.

6. The batch production system according to claim 5, wherein at least one compensation value comprises at least one angle offset value associated with an axis (A1, A2, A3) of the movement system.

7. The batch production system according to claim 4, wherein at least one compensation value comprises at least one angle offset value associated with an axis (A1, A2, A3) of the movement system.

8. The batch production system according to claim 1, wherein modifying the volumetric compensation map is further based on at least one of a position and an orientation of the workpiece support.

9. A batch production method of consecutively machining a batch of workpieces into machined pieces with a machine tool, the method comprising
   placing a first workpiece of the batch of workpieces at a workpiece support of the machine tool,
   providing numerical control data based on nominal geometry data representing a target piece that is desired to be achieved when machining the batch of workpieces into the machined pieces,
   machining the first workpiece into a first machined piece with a cutting tool of the machine tool and by controlling a movement system of the machine tool based on the numerical control data and
      volumetric compensation map for compensating volumetric positioning errors of the movement system, wherein the volumetric positioning errors comprise intrinsic errors of the machine tool,
   determining measurement data, the measurement data based on at least one geometrical property of the first machined piece,
   providing the measurement data to a computer,
   modifying the volumetric compensation map with the computer based on the measurement data and the nominal geometry data,
   placing a second workpiece of the batch of workpieces at the workpiece support of the machine tool,
   machining the second workpiece into a second machined piece with the cutting tool of the machine tool and by controlling the movement system of the machine tool based on
      the numerical control data and
      the modified volumetric compensation map.

10. The batch production method according to claim 9, wherein the measurement data comprise three-dimensional point coordinates for at least one point.

11. The batch production method according to claim 10, wherein the measurement data comprise a three-dimensional point cloud.

12. The batch production method according to claim 11, wherein the volumetric compensation map comprise at least one compensation value associated with a three-dimensional position coordinate of the movement system.

13. The batch production method according to claim 12, wherein the at least one compensation value comprises at least one position offset value associated with an axis of the movement system.

14. The batch production method according to claim 10, wherein the volumetric compensation map comprise at least one compensation value associated with a three-dimensional position coordinate of the movement system.

15. The batch production method according to claim 9, wherein the measurement data comprise a three-dimensional point cloud.

16. The batch production method according to claim 15, wherein the at least one compensation value comprises at least one position offset value associated with an axis of the movement system.

17. The batch production method according to claim 16, wherein at least one compensation value comprises at least one angle offset value associated with an axis (A1, A2, A3) of the movement system.

18. The batch production method according to claim 15, wherein at least one compensation value comprises at least one angle offset value associated with an axis (A1, A2, A3) of the movement system.

19. The batch production method according to claim 9, further comprising determining at least one of a position and an orientation of the workpiece support, wherein modifying the volumetric compensation map is further based on at least one of the position and orientation.

\* \* \* \* \*